US009847546B2

(12) United States Patent
Yang et al.

(10) Patent No.: US 9,847,546 B2
(45) Date of Patent: Dec. 19, 2017

(54) SEPARATOR FOR FUEL CELL AND FUEL CELL INCLUDING THE SAME

(71) Applicant: POSCO, Pohang-si, Gyeongsangbuk-do (KR)

(72) Inventors: Choong-Mo Yang, Pohang-si (KR); Seung-Goo Kim, Seoul (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 105 days.

(21) Appl. No.: 14/654,840

(22) PCT Filed: Dec. 24, 2013

(86) PCT No.: PCT/KR2013/012151
§ 371 (c)(1),
(2) Date: Jun. 22, 2015

(87) PCT Pub. No.: WO2014/104732
PCT Pub. Date: Jul. 3, 2014

(65) Prior Publication Data
US 2015/0340723 A1 Nov. 26, 2015

(30) Foreign Application Priority Data
Dec. 24, 2012 (KR) .................. 10-2012-0152259

(51) Int. Cl.
*H01M 10/6566* (2014.01)
*H01M 8/2485* (2016.01)
(Continued)

(52) U.S. Cl.
CPC ....... *H01M 8/2485* (2013.01); *H01M 8/0202* (2013.01); *H01M 8/0258* (2013.01);
(Continued)

(58) Field of Classification Search
None
See application file for complete search history.

(56) References Cited

U.S. PATENT DOCUMENTS

2004/0137298 A1    7/2004  Sugiura et al.
2004/0224206 A1*  11/2004  Matsumoto ........... H01M 4/926
                                                          429/413
(Continued)

FOREIGN PATENT DOCUMENTS

CN      1503998 A     6/2004
JP      08-180883 A   7/1996
(Continued)

OTHER PUBLICATIONS

Japanese Office Action dated Aug. 2, 2016 issued in Japanese Patent Application No. 2015-549279 (English translation).
(Continued)

*Primary Examiner* — Yoshitoshi Takeuchi
(74) *Attorney, Agent, or Firm* — McDermott Will & Emery LLP

(57) ABSTRACT

There are provided a separator for a fuel cell and a fuel cell including the same able to enhance the horizontal distribution of fuel or an oxidizing agent and secure an effective flow area, the separator including: a separator body; a first intake manifold provided at one end portion of the separator body; a second intake manifold provided at the other end portion of the separator body to be partitioned from the first intake manifold; a first exhaust manifold provided outwardly of the second intake manifold at the other end portion of the separator body; and a second exhaust manifold provided outwardly of the first intake manifold at one end portion of the separator body to be partitioned from the first exhaust manifold.

8 Claims, 7 Drawing Sheets

(51) Int. Cl.

| | | |
|---|---|---|
| *H01M 8/2483* | (2016.01) | |
| *H01M 8/0202* | (2016.01) | |
| *H01M 8/0258* | (2016.01) | |
| *H01M 8/04089* | (2016.01) | |
| *H01M 8/04082* | (2016.01) | |
| *H01M 8/1018* | (2016.01) | |

(52) U.S. Cl.
CPC ... *H01M 8/04089* (2013.01); *H01M 8/04201* (2013.01); *H01M 2008/1095* (2013.01)

(56) References Cited

U.S. PATENT DOCUMENTS

| | | | |
|---|---|---|---|
| 2005/0019646 A1* | 1/2005 | Joos | H01M 4/8626 |
| | | | 429/434 |
| 2010/0009238 A1 | 1/2010 | Goto | |
| 2012/0295178 A1 | 11/2012 | Farrington et al. | |
| 2013/0280633 A1 | 10/2013 | Kim et al. | |

FOREIGN PATENT DOCUMENTS

| | | |
|---|---|---|
| JP | 2000-182637 A | 6/2000 |
| JP | 2002-260710 A | 9/2002 |
| JP | 2003-208909 A | 7/2003 |
| JP | 2004-039483 A | 2/2004 |
| JP | 2004-103452 A | 4/2004 |
| JP | 2006-318863 A | 11/2006 |
| JP | 2007-317525 A | 12/2007 |
| JP | 2008-186671 A | 8/2008 |
| JP | 2009-026524 A | 2/2009 |
| JP | 2011-096498 A | 5/2011 |
| KR | 10-2003-0081502 A | 10/2003 |
| KR | 10-2012-0075056 A | 7/2012 |
| WO | 03/061039 A2 | 7/2003 |
| WO | 2004/025764 A1 | 3/2004 |

OTHER PUBLICATIONS

Chinese Office Action dated Aug. 3, 2016 issued in Chinese Patent Application No. 201380067549.6 (English translation).
European Search Report dated Dec. 14, 2015 issued in European Patent Appllication No. 13867794.3.

* cited by examiner

[Figure 1]
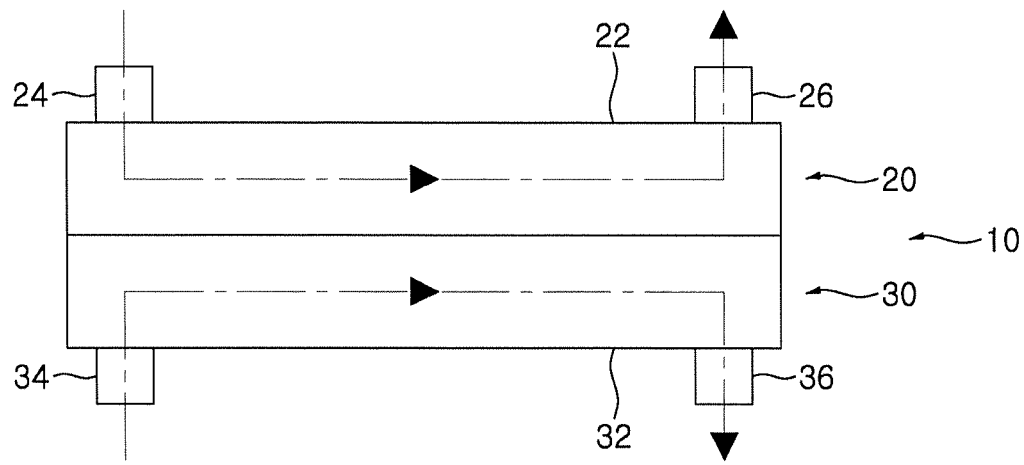
[Figure 2]
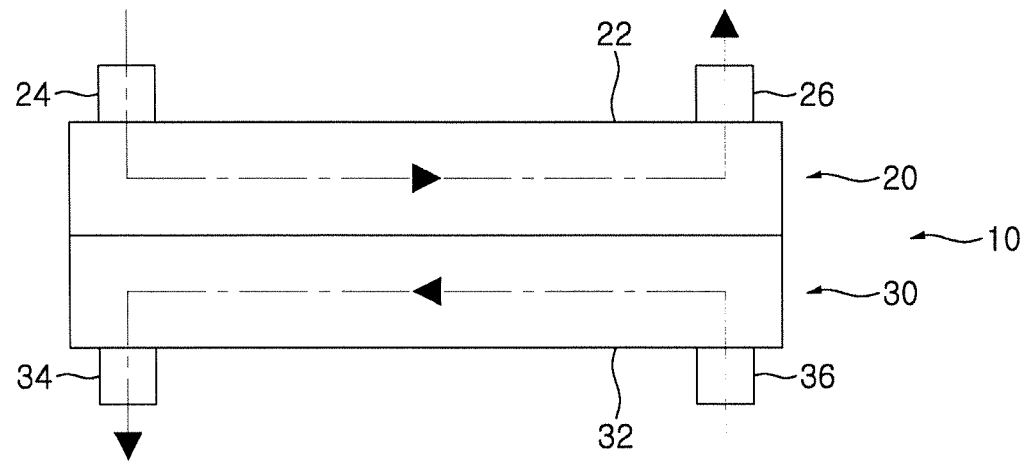

[Figure 3]
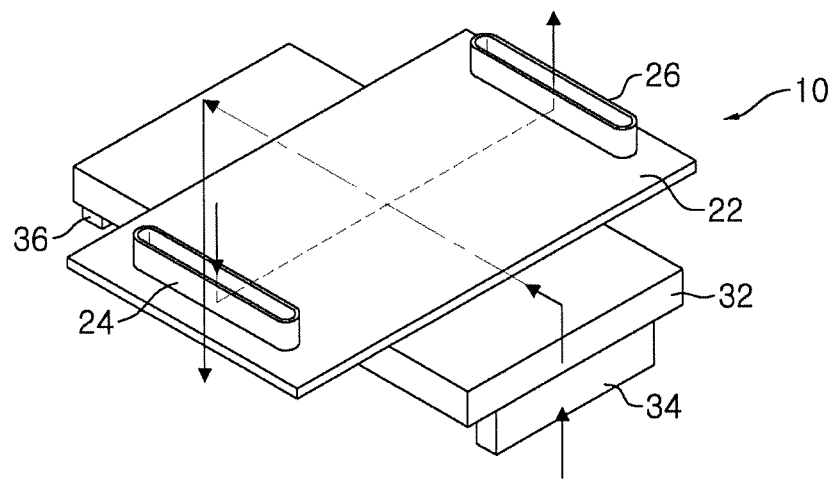
[Figure 4]
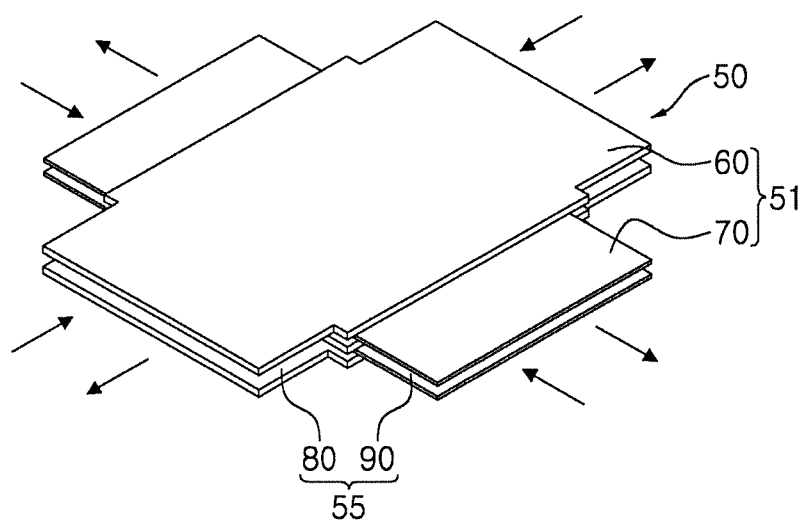

[Figure 5]
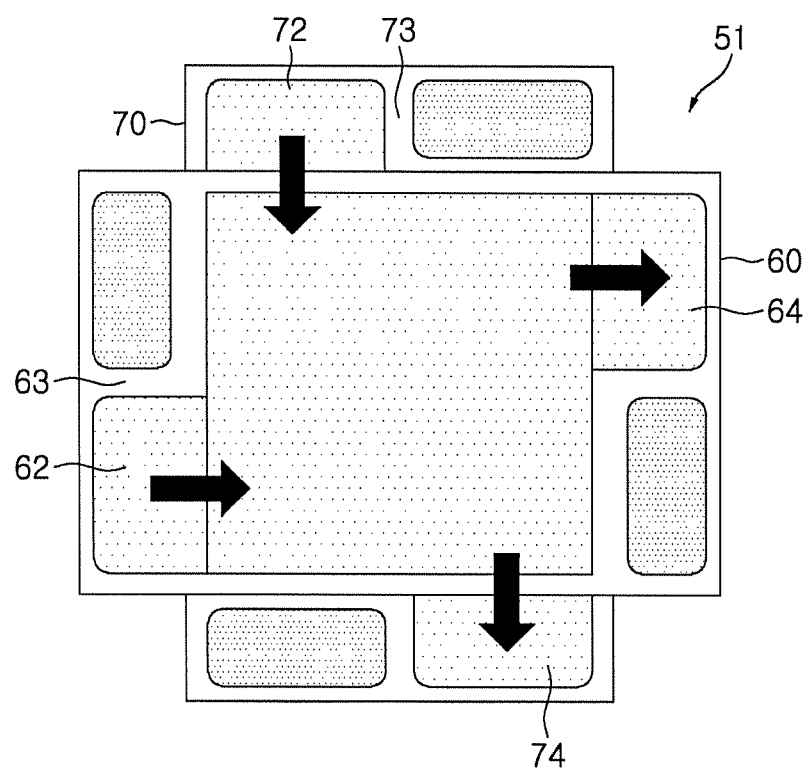

[Figure 6]
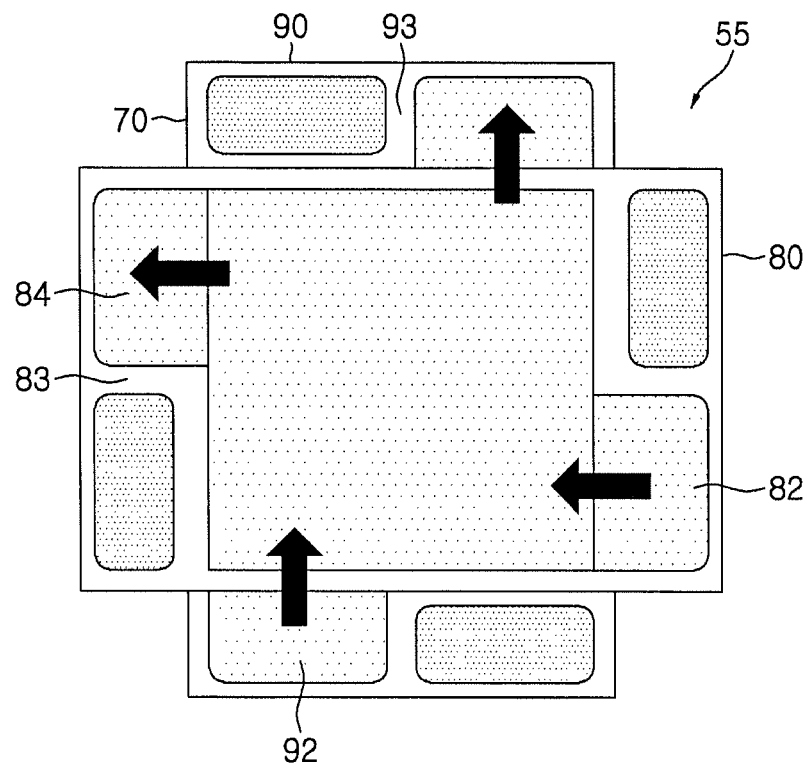
[Figure 7]
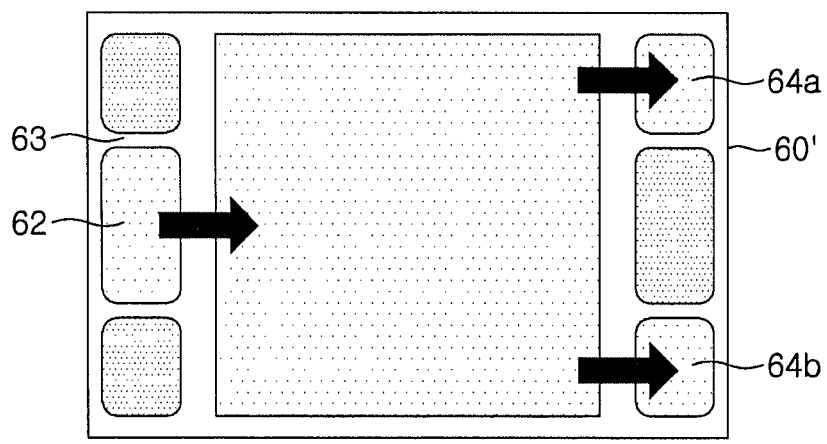

【Figure 8】
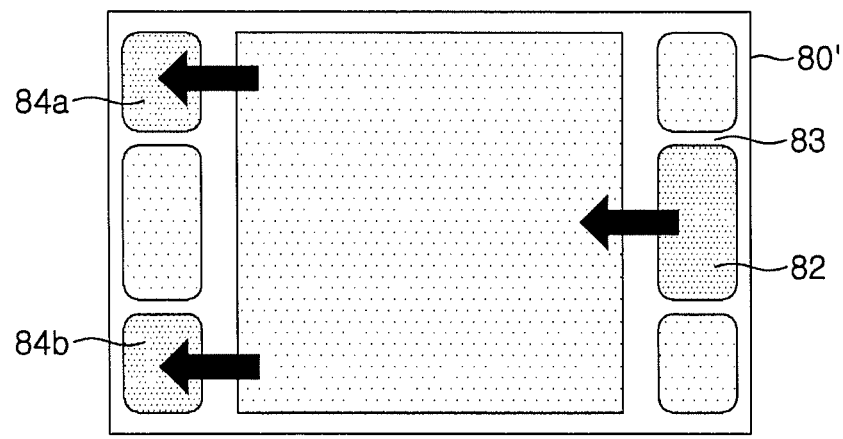
【Figure 9】
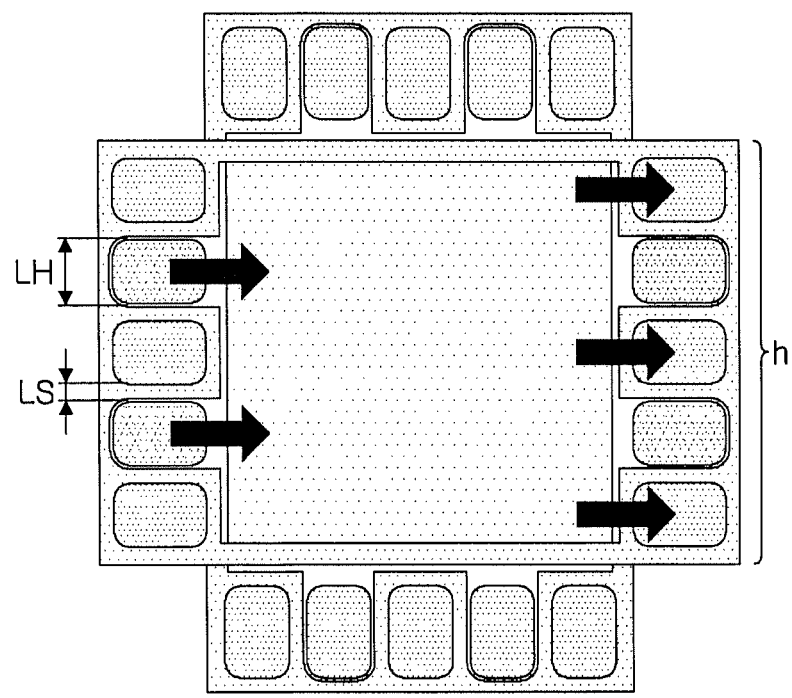

[Figure 10]
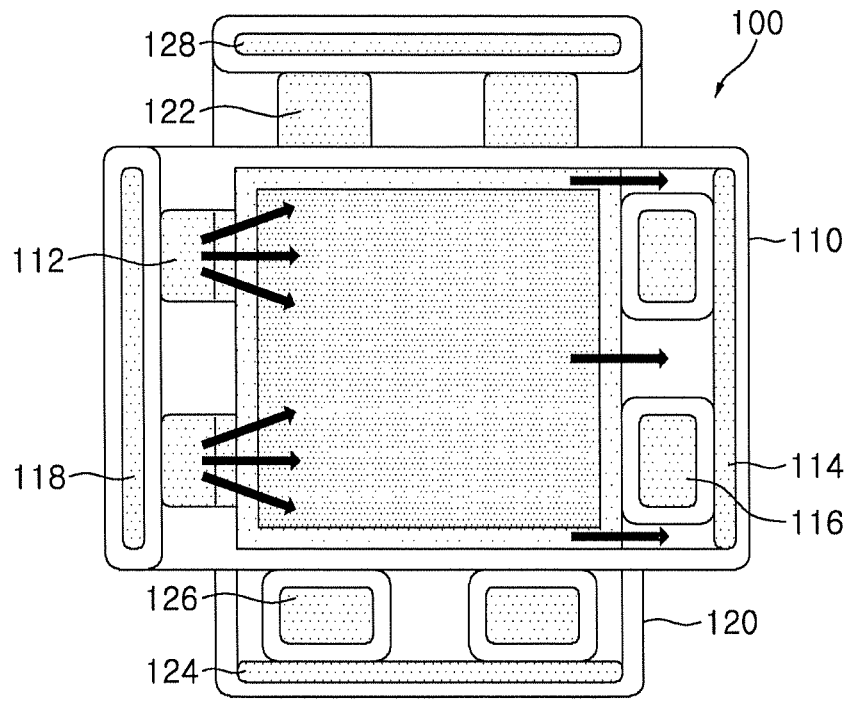
[Figure 11]
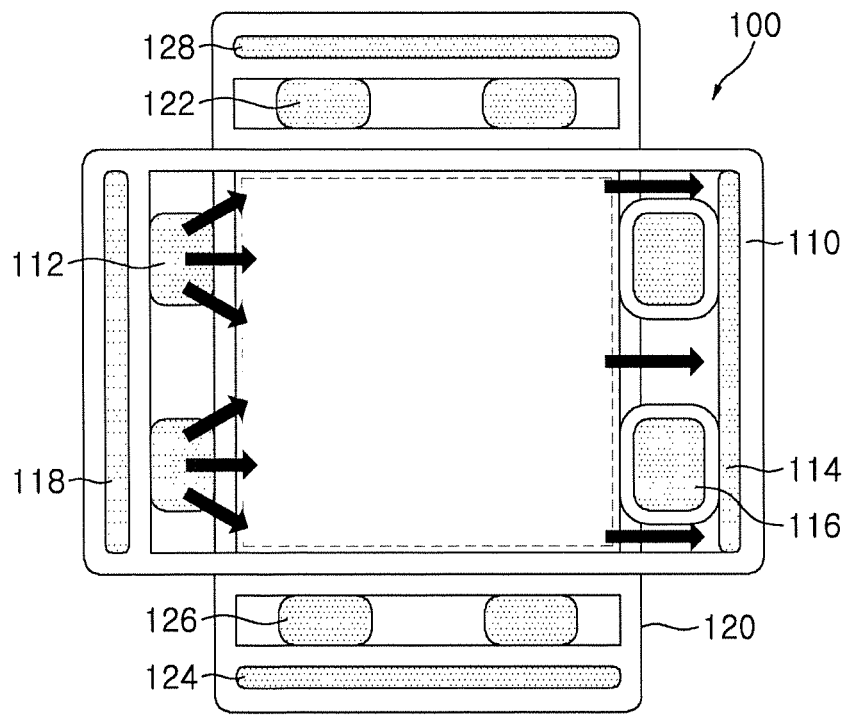

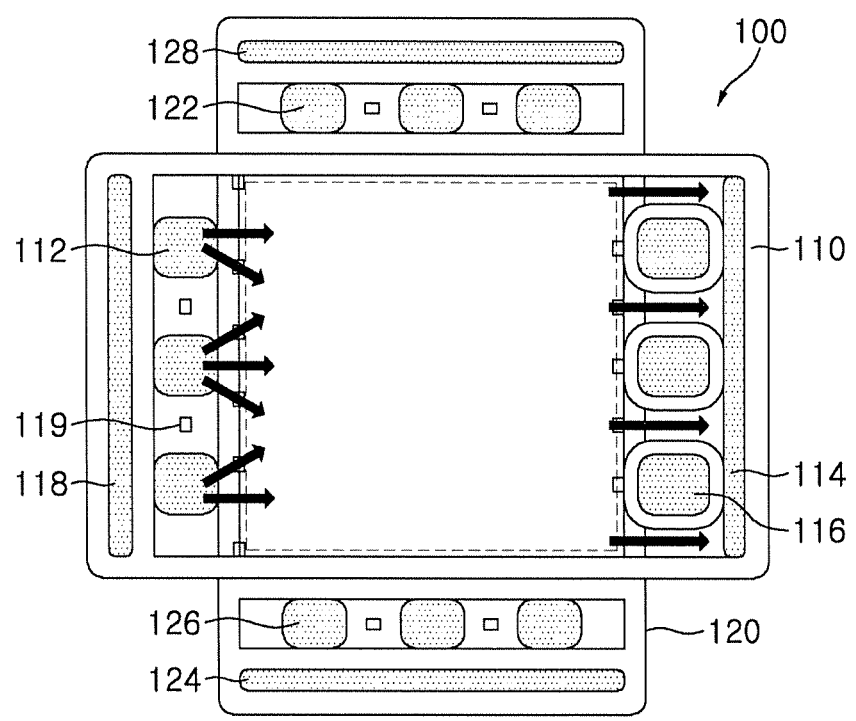
[Figure 12]

SEPARATOR FOR FUEL CELL AND FUEL CELL INCLUDING THE SAME

RELATED APPLICATIONS

This application is the U.S. National Phase under 35 U.S.C. §371 of International Application No. PCT/KR2013/012151, filed on Dec. 24, 2013 which in turn claims the benefit of Korean Patent Application No. 10-2012-0152259 filed on Dec. 24, 2012, the disclosures of which the applications are incorporated by reference herein.

TECHNICAL FIELD

The present disclosure relates to a separator for a fuel cell and a fuel cell including the same and, more particularly, to a separator for a fuel cell and a fuel cell including the same able to enhance the horizontal distribution of fuel or an oxidizing agent and secure an effective flow area.

BACKGROUND ART

In general, fuel cells are power generation systems converting the chemical energy of fuel into electrical energy. For example, a fuel cell converts chemical energy, generated during a chemical reaction between hydrogen fuel supplied to an anode and an oxidizing agent injected into a cathode, into electrical energy.

Such fuel cells are classified as low-temperature type fuel cells and high-temperature type fuel cells according to operating temperature and electrolyte type. A proton exchange membrane fuel cell (PEMFC) is representative of low-temperature type fuel cells and is mainly used for vehicles or the like, while a molten carbonate fuel cell (MCFC), a solid oxide fuel cell (SOFC), and a solid oxide electrolysis cell (SOEC) using a reverse reaction of SOFC are representative of high-temperature type fuel cells.

A fuel cell 10 is capable of continuously generating power while fuel (hydrogen) and an oxidizing agent are continuously injected thereinto, and by enhancing the utilization rate of fuel in consideration of power generation efficiency and economical efficiency, such a fuel cell may have increased commercial value.

Separators 20 and 30 for the conventional fuel cell 10 include flat plates 22 and 32 providing a flow path in which fuel or an oxidizing agent flows. Intake manifolds 24 and 34 into which the fuel or the oxidizing agent is introduced are provided at one end portions of the flat plates 22 and 32, and exhaust manifolds 26 and 36 from which the fuel or the oxidizing agent is discharged are provided at the other end portions of the flat plates 22 and 32 to be opposite to the intake manifolds 24 and 34. Such separators 20 and 30 for the fuel cell 10 are alternately stacked to form a stack.

Meanwhile, conventional fuel cells 10 are classified according to a variety of schemes on the basis of arrangements of the separators 20 and 30 and the like. For example, representative schemes are a co-flow scheme in which the fuel and the oxidizing agent are introduced in the same direction as illustrated in FIG. 1, a counter-flow scheme in which the fuel and the oxidizing agent are introduced in opposite directions as illustrated in FIG. 2, and a cross-flow scheme in which the fuel and the oxidizing agent are introduced in directions perpendicular to each other as illustrated in FIG. 3.

The flow directions and operating conditions (load, utilization rate and the like) of the fuel and the oxidizing agent in the conventional fuel cell 10 may be determined according to the structures, arrangements, or the like of the separators 20 and 30, and accordingly, it is determined where an electrochemical reaction occurs. Furthermore, due to the structural constraints of the separators 20 and 30 according to the related art, a portion of the fuel cell where the electrochemical reaction occurs is biased toward one side, and accordingly, the temperature gradient is also biased toward one side.

Therefore, the thermal stress distribution in the entire stack of the conventional fuel cell 10 may be asymmetrical, and accordingly, power generation efficiency may be lowered due to the non-uniform flow or biased flow of the fuel or the oxidizing agent. As such non-uniformity is continued, this consequently causes a negative effect on the structural stability of the stack during thermal cycling in the stack.

In this regard, as illustrated in FIGS. 4 through 6, a cross-shift flow scheme has recently been suggested in order to solve the structural constraints in the co-flow scheme, the counter-flow scheme, and the cross-flow scheme.

A fuel cell 50 using a cross-shift flow scheme is provided to reduce non-uniformity of the overall temperature gradient by alternately forming manifold structures in odd-numbered unit cells and even-numbered unit cells.

That is, in separators 60 of the odd-numbered unit cell 51 in which fuel or an oxidizing agent is circulated, some regions of the separators are provided with intake manifolds 62 and 72 into which the fuel or the oxidizing agent is introduced and other regions thereof are provided with exhaust manifolds 64 and 74 from which the fuel or the oxidizing agent is discharged.

In addition, in separators 80 and 90 of the even-numbered unit cell 55 in which the fuel or the oxidizing agent is circulated, intake manifolds 82 and 92 and exhaust manifolds 84 and 94 are provided to intersect those of the separators 60 and 70 of the odd-numbered unit cell 51.

Such a fuel cell 50 using the cross-shift flow scheme may solve the issue of non-uniformity of the temperature gradient to some extent, but portions of the intake manifolds 82 and 92 and the exhaust manifolds 84 and 94 are blocked in corresponding cells, causing a flow distribution in a horizontal direction to be degraded. Thus, the fuel may not be uniformly supplied to the entirety of the cells, whereby the overall performance of the fuel cell 50 may be lowered.

In this regard, a technique for allowing for uniform flow distribution throughout the entirety of the cells through the distributed arrangement of the intake manifolds 82 and 92 and the exhaust manifolds 84 and 94 has been developed.

However, since the conventional fuel cell 50 using the cross-shift flow scheme has sealing members 63, 73, 83 and 93 for sealing between the intake manifolds 62, 72, 82 and 92 and the exhaust manifolds 64, 74, 84 and 94, the sealing members 63, 73, 83 and 93 may interrupt the diffusion of the fuel or the oxidizing agent in the horizontal direction while the fuel or the oxidizing agent is flowing from the intake manifolds 62, 72, 82 and 92 to a reaction surface of the cell, resulting in a flow deviation between the manifold holes and the blocked portions of the manifolds.

Meanwhile, the fuel cell 50 using the cross-shift flow scheme may be modified in order to allow the horizontal diffusion to be more uniform. For example, a separator 60' of the odd-numbered unit cell 51 in which the fuel or the oxidizing agent is circulated may be modified to have the intake manifold 62 which is disposed in an intermediate position and exhaust manifolds 64a and 64b which are separately formed.

In addition, for example, a separator 80' of the even-numbered unit cell 55 in which the fuel or the oxidizing agent is circulated may be modified to have the intake manifold 82 which is disposed in an intermediate position and exhaust manifolds 84a and 84b which are separately formed. In this case, the intake manifold 82 and the exhaust manifolds 84a and 84b may be sealed by the sealing members 63 and 83.

Meanwhile, referring to FIG. 9, the conventional fuel cell 50 using the cross-shift flow scheme may create more uniform horizontal diffusion as the number of intake manifolds and exhaust manifolds is increased. However, an area occupied by the sealing members 63 and 83 is also increased and an effective flow area for actual flow is reduced, and accordingly, the overall reaction efficiency and fuel utilization rate may be lowered.

That is, when LH denotes the width of the intake manifold and the exhaust manifold and LS denotes the width of the sealing member, the number of sealing members having the same width may be (n−1) with respect to the n number of manifolds.

The width L of the effective flow area of the fuel cell is represented by the following equation 1:

$$L = \frac{L_H \times n}{L_H \times n + L_S \times (n-1)} \qquad \text{[Equation 1]}$$

Therefore, the conventional fuel cell should be developed to have a structure in which the horizontal distribution of the fuel or the oxidizing agent is improved without reducing the effective flow area L of the fuel cell.

DISCLOSURE

Technical Problem

An aspect of the present disclosure provides a separator for a fuel cell and a fuel cell including the same able to enhance the horizontal distribution of fuel or an oxidizing agent and secure an effective flow area.

Technical Solution

According to an aspect of the present disclosure, there is provided a separator for a fuel cell, including: a separator body; a first intake manifold provided at one end portion of the separator body; a second intake manifold provided at the other end portion of the separator body to be partitioned from the first intake manifold; a first exhaust manifold provided outwardly of the second intake manifold at the other end portion of the separator body; and a second exhaust manifold provided outwardly of the first intake manifold at one end portion of the separator body to be partitioned from the first exhaust manifold.

The separator body may be provided with one or more of the first and second intake manifolds.

The first exhaust manifold and the second exhaust manifold may be elongated in a width direction of the separator body.

The separator body may have a circulation path between the first intake manifold and the first exhaust manifold in the interior thereof.

According to another aspect of the present disclosure, there is provided a fuel cell including one or more unit cells stacked therein, wherein the unit cell may include the separator for a fuel cell as described above, the separator including a plurality of separators, and the separators for a fuel cell may be stacked to intersect perpendicularly to allow fuel or an oxidizing agent to intersect and circulate.

The separator body may have a circulation path between the first intake manifold and the first exhaust manifold in the interior thereof.

The circulation path may allow a gas supplied by the first intake manifold to pass between the second intake manifolds and be discharged through the first exhaust manifold.

The second intake manifold of the separator may be connected to a first intake manifold of another separator by sealing, and the second exhaust manifold of the separator may be connected to a first exhaust manifold of another separator by sealing.

Advantageous Effects

According to an exemplary embodiment in the present disclosure, intake and exhaust manifolds are arranged in two rows, such that a space available for the diffusion of fuel or an oxidizing agent supplied by the intake manifolds is secured, resulting in secured effective area and improved horizontal distribution, while a single exhaust manifold is provided such that biased flow, which may be caused by a flow change or the like, resulting from a reaction, is reduced. Accordingly, the fuel cell, according to the present embodiment, may have improvements in the reaction efficiency and utilization rate of the fuel due to the improved horizontal distribution, the secured effective area, and the reduction of biased flow.

DESCRIPTION OF DRAWINGS

FIG. 1 is a view illustrating the operation of a fuel cell using a co-flow scheme according to the related art;

FIG. 2 is a view illustrating the operation of a fuel cell using a counter-flow scheme according to the related art;

FIG. 3 is a view illustrating the operation of a fuel cell using a cross-flow scheme according to the related art;

FIG. 4 is a perspective view of a fuel cell using a cross-shift flow scheme according to the related art;

FIG. 5 is a plan view of an odd-numbered separator of a fuel cell using a cross-shift flow scheme according to the related art;

FIG. 6 is a plan view of an even-numbered separator of a fuel cell using a cross-shift flow scheme according to the related art;

FIG. 7 is a plan view of a modified separator of a fuel cell using a cross-shift flow scheme according to the related art;

FIG. 8 is a plan view of another modified separator of a fuel cell using a cross-shift flow scheme according to the related art;

FIG. 9 is a view illustrating an effective flow area of a fuel cell using a cross-shift flow scheme according to the related art;

FIG. 10 is a plan view of a separator for a fuel cell according to an exemplary embodiment in the present disclosure;

FIG. 11 is a view illustrating a reaction region of a separator for a fuel cell according to an exemplary embodiment in the present disclosure; and FIG. 12 is a plan view of a separator for a fuel cell according to another exemplary embodiment in the present disclosure.

BEST MODE FOR CARRYING OUT THE INVENTION

Hereinafter, embodiments of the present disclosure will be described in detail with reference to the accompanying drawings. The disclosure may, however, be exemplified in many different forms and should not be construed as being limited to the specific embodiments set forth herein. In the drawings, the shapes and dimensions of elements may be exaggerated for clarity, and the same reference numerals will be used throughout to designate the same or like elements.

FIG. 10 is a plan view of a separator for a fuel cell according to an exemplary embodiment in the present disclosure.

Referring to FIG. 10, a fuel cell 100 according to the present embodiment may be provided with one or more unit cells stacked therein. For example, the fuel cell 100 may have a stack structure in which separators and cells are alternately stacked in order of a separator, a cell, a separator, a cell and so on.

Such a unit cell may include one or more separators 110 and 120 and may generate energy through the oxidation-reduction reaction of fuel and an oxidizing agent supplied to the separators 110 and 120.

In the fuel cell 100 according to the present embodiment, the separators 110 and 120 of the unit cells may be alternately stacked, wherein even-numbered separators may be connected to each other and odd-numbered separators may be connected to each other.

In addition, the fuel cell 100 according to the present embodiment may be a solid oxide fuel cell (SOFC) by way of example.

Such unit cells used in the fuel cell 100 may be stacked and connected to each other so as to increase the amount of voltage supplied thereto.

The fuel cell 100 may include an electrolyte membrane provided to separate the fuel from the oxidizing agent in the separators, and an anode and a cathode provided on both sides of the separators based on the electrolyte membrane, besides the separators 110 and 120 for separately supplying and discharging the fuel and the oxidizing agent.

More specifically, the fuel cell 100 according to the present embodiment may include the separator 110 to which the fuel is supplied, and the separator 110 for fuel may be associated with the separator 120 to which the oxidizing agent is supplied.

The separator 110 for fuel and the separator 120 for the oxidizing agent may be provided to intersect in directions perpendicular to each other, and accordingly, the fuel or the oxidizing agent may be supplied while intersecting and circulating in the directions perpendicular to each other.

Meanwhile, the separator 110 or 120 may include a flat plate which is a separator body having a circulation path for guiding the flow of the fuel or the oxidizing agent in the interior thereof.

In addition, one end portions of the separator bodies of the separators 110 and 120 may be provided with first intake manifolds 112 and 122 to which a gas, namely, the fuel or the oxidizing agent is supplied.

Furthermore, the other end portions of the separator bodies of the separators 110 and 120 may be provided with second intake manifolds 116 and 126 which are partitioned from the first intake manifolds 112 and 122. The second intake manifolds 116 and 126 may be provided at the other end portions of the separator bodies to be sealed by using a sealing member or the like, and accordingly, the second intake manifolds 116 and 126 do not supply the gases to the separators 110 and 120, but supply the gases to other separators 110 and 120 connected thereto through first intake manifolds 112 and 122 of the other separators 110 and 120.

In addition, the other end portions of the separators 110 and 120, which are opposing regions in which the gases reach after passing through an effective reaction region of the cell, may be provided with first exhaust manifolds 114 and 124 from which the gases supplied by the first intake manifolds 112 and 122 are discharged after passing between the second intake manifolds 116 and 126.

Furthermore, one end portions of the separator bodies of the separators 110 and 120 may be provided with second exhaust manifolds 118 and 128, outwardly of the first intake manifolds 112 and 122, as spaces partitioned from the first exhaust manifolds 114 and 124.

In addition, the second exhaust manifolds 118 and 128 may be provided outwardly of the first intake manifolds 112 and 122 at one end portions of the separator bodies of the separators 110 and 120 to be sealed by using a sealing member or the like. The second exhaust manifolds 118 and 128 may be connected to first exhaust manifolds 114 and 124 of other separators 110 and 120 connected thereto, and accordingly, without the discharge of the gases to the separators 110 and 120, the second exhaust manifolds 118 and 128 may be connected to the first exhaust manifolds 114 and 124 of the other separators 110 and 120 connected thereto to discharge the gases.

According to the present embodiment, one or more first intake manifolds 112 and 122 may be provided at one end portions of the separator bodies. Preferably, according to the present embodiment, two first intake manifolds 112 and 122 may be provided to be spaced apart from each other by a predetermined interval.

Furthermore, the first exhaust manifolds 114 and 124 may be formed at the other end portions of the separator bodies to be elongated in the width direction of the separator bodies. That is, the first exhaust manifolds 114 and 124, according to the present embodiment, may be provided in the form of a hole, and may be provided as a long slot elongated in the width direction.

Therefore, the first exhaust manifolds 114 and 124 may rapidly discharge the fuel or the oxidizing agent that has undergone an electrochemical reaction in the interior of the cell to the second exhaust manifolds 118 and 128, and the biased flow or the like may be prevented. Without the occurrence of a bottleneck phenomenon, a flow restriction may be minimized.

Meanwhile, the second intake manifolds 116 and 126 may be provided inwardly of the first exhaust manifolds 114 and 124 and may be connected to first intake manifolds 112 and 122 of other separators 110 and 120. Such second intake manifolds 116 and 126 may be provided as paths for supplying the fuel or the oxidizing agent to the first intake manifolds 112 and 122 of the other separators 110 and 120.

In addition, the second exhaust manifolds 118 and 128 may be provided outwardly of the first intake manifolds 112 and 122 and may be connected to the first exhaust manifolds 114 and 124 of the other separators 110 and 120.

As described above, according to the present embodiment, both end portions of the separator bodies may be provided with the second exhaust manifolds 118 and 128 and the first intake manifolds 112 and 122 arranged in two rows and the second intake manifolds 116 and 126 and the first exhaust manifolds 114 and 124 arranged in two rows.

Therefore, the gases, namely, the fuel or the oxidizing agent, supplied by the first intake manifolds 112 and 122 may pass through spaces between the second intake manifolds 116 and 126 to be discharged through the first exhaust manifolds 114 and 124.

Meanwhile, according to the present embodiment, the fuel may include gaseous hydrogen. In addition, the oxidizing agent may include gaseous oxygen.

Furthermore, pure oxygen may be used as the gaseous oxygen. In the present embodiment, air containing oxygen may also be used.

Meanwhile, according to the present embodiment, the separators 110 and 120 may be stacked together with adjacent other separators 110 and 120, while having the electrolyte membranes interposed therebetween.

At this time, the fuel may be circulated to one separator 110 and the oxidizing agent may be circulated to the other separator 120. Here, the electrolyte membrane may block the permeation of the fuel and the oxidizing agent, have no electronic conductivity and allow oxygen ions or hydrogen ions to be permeated therethrough.

Therefore, through an electrochemical reaction between the fuel passing through one cell and the oxidizing agent passing through the other cell, the hydrogen ions of the fuel or the oxygen ions of the oxidizing agent may pass through the electrolyte membrane to trigger an oxidation-reduction reaction to thereby produce water (H₂O), and during this procedure, electrons are generated. Such a reaction is represented by the following chemical formula 1 or chemical formula 2:

Cathode:½O₂+2e⁻ ↔ O⁻²

Anode:O⁻²+H₂ ↔ H₂O+2e⁻         [Chemical Formula 1]

Cathode:½O₂+2H⁺→H₂O

Anode:H₂→2H⁺+2e⁻         [Chemical Formula 2]

The fuel cell 100, according to the exemplary embodiment, may improve the flow distribution in the horizontal direction, without a reduction in the effective flow area of the gases, the fuel or the oxidizing agent, supplied by the first intake manifolds 112 and 122 of the separators 110 and 120, to thereby increase the actual circulation flow. Thus, the fuel utilization rate and reactivity may be improved.

MODE FOR CARRYING OUT THE INVENTION

FIG. 11 is a view illustrating a reaction region of a separator for a fuel cell according to an exemplary embodiment in the present disclosure.

Meanwhile, according to the present embodiment, the separators 110 and 120 for the fuel cell 100 may have a reaction region formed while the gases introduced into the first intake manifolds 112 and 122 are being discharged through the first exhaust manifolds 114 and 124.

In the fuel cell 100 according to the exemplary embodiment, the separators 110 and 120 may have the first intake manifolds 112 and 122 and the first exhaust manifolds 114 and 124 corresponding thereto, wherein the gas from the first intake manifolds 112 may be discharged through a single first exhaust manifold 114 and the gas from the first intake manifolds 122 may be discharged through a single first exhaust manifold 124, and may have the second intake manifolds 116 and 126 and the second exhaust manifolds 118 and 128 connected to the first intake manifolds 112 and 122 and the first exhaust manifolds 114 and 124 of other separators 110 and 120, respectively. However, the present inventive concept is not limited thereto, and various modifications may be made.

For example, referring to FIG. 12, the fuel or the oxidizing agent introduced into three first intake manifolds 112 or 122 of the separators 110 or 120 of the fuel cell 100, which are connected to second intake manifolds 116 or 126 of other separators 110 or 120 thereof, may be discharged through a single first exhaust manifold 114 or 124. In addition, the first exhaust manifolds 114 and 124 may be connected to second exhaust manifolds 118 and 128 of the other separators 110 or 120, respectively.

As described above, according to the present embodiment, the first intake manifolds 112 and 122 and the first exhaust manifolds 114 and 124 may be sequentially arranged in two rows, unlike the alternate arrangement according to the related art, such that the fuel or the oxidizing agent is supplied in the front row, passes through the reaction region, and then the reacted fuel or oxidizing agent is discharged in the rear row.

In addition, the separators 110 and 120 may be provided to intersect perpendicularly, and accordingly, for example, the fuel may be circulated in one separator 110 while the oxidizing agent may be circulated in the other separator 120 in a direction perpendicular to the direction of fuel circulation.

Furthermore, the separators 110 and 120 may be provided with guide protrusions 119 for guiding the circulation of the fuel or the oxidizing agent.

Meanwhile, according to the present embodiment, the connections of the manifolds provided in the fuel cell 100 are illustrated to help in visualization thereof, but are not limited thereto and may be modified in various manners. For example, the manifolds may be connected below the separators. Specifically, the first intake manifolds 112 and 122, the first exhaust manifolds 114 and 124, the second intake manifolds 126 and 128 and the second exhaust manifolds 118 and 128 of the separators 110 and 120 may be connected below other separators 110 and 120, while passing through other separators.

While exemplary embodiments have been shown and described above, it will be apparent to those skilled in the art that modifications and variations could be made without departing from the scope of the present invention as defined by the appended claims.

The invention claimed is:

1. A separator for a fuel cell, comprising:
   a separator body;
   a first intake manifold provided at one end portion of the separator body;
   a second intake manifold provided at the other end portion of the separator body to be partitioned from the first intake manifold;
   a first exhaust manifold provided outwardly of the second intake manifold at the other end portion of the separator body; and
   a second exhaust manifold provided outwardly of the first intake manifold at one end portion of the separator body to be partitioned from the first exhaust manifold,
   wherein the first intake manifold and the second exhaust manifold are arranged in separate rows in a longitudinal direction perpendicular to a width direction of the separator body at one end portion of the separator body, and the second intake manifold and the first exhaust manifold are arranged in separate rows in the longitudinal direction perpendicular to the width direction of the separator body at the other end portion of the separator body,
   wherein the first exhaust manifold and the second exhaust manifold are elongated in the width direction of the separator body.

2. The separator for a fuel cell of claim 1, wherein the separator body is provided with one or more of the first and second intake manifolds.

3. The separator for a fuel cell of claim 2, wherein the separator body has a circulation path between the first intake manifold and the first exhaust manifold in the interior thereof.

4. The separator for a fuel cell of claim 1, wherein the separator body has a circulation path between the first intake manifold and the first exhaust manifold in the interior thereof.

5. A fuel cell comprising one or more unit cells stacked therein,
   wherein the unit cell includes the separator for a fuel cell of claim 1, the separator comprising a plurality of separators, and
   the separators for a fuel cell are stacked to intersect perpendicularly to allow fuel or an oxidizing agent to intersect and circulate.

6. A fuel cell of claim 5, wherein the separator body has a circulation path between the first intake manifold and the first exhaust manifold in the interior thereof.

7. The fuel cell of claim 6, wherein the circulation path allows a gas supplied by the first intake manifold to pass between the second intake manifolds and be discharged through the first exhaust manifold.

8. The fuel cell of claim 5, wherein the second intake manifold of the separator is connected to a first intake manifold of another separator by sealing, and
   the second exhaust manifold of the separator is connected to a first exhaust manifold of another separator by sealing.

* * * * *